(No Model.)

W. H. PETTIT.
SLEIGH BRACE.

No. 243,966. Patented July 5, 1881.

Witnesses:
W. C. McArthur
John C. Rogers

Inventor:
W. H. Pettit,
per W. H. Alexander
Attorney

N. PETERS, Photo-Lithographer, Washington, D. C.

UNITED STATES PATENT OFFICE.

WILLIAM H. PETTIT, OF GRAND RAPIDS, MICHIGAN.

SLEIGH-BRACE.

SPECIFICATION forming part of Letters Patent No. 243,966, dated July 5, 1881.

Application filed December 7, 1880. (No model.)

*To all whom it may concern:*

Be it known that I, WILLIAM H. PETTIT, of Grand Rapids, in the county of Kent and State of Michigan, have invented certain new and useful Improvements in Sleigh-Braces; and I do hereby declare that the following is a full, clear, and exact description thereof, reference being had to the accompanying drawings, and to the letters of reference marked thereon, which form part of this specification.

The nature of my invention relates to braces for the knees and runners of sleighs. The braces ordinarily used brace in one direction only, and are in the way in painting and otherwise finishing the sleigh, and to remedy these defects is the object of my invention, which consists in a metallic box adapted to be applied after the sleigh is finished and painted, and provided with wings which brace it in all directions, as will be more fully set forth hereinafter, and pointed out in the claims.

In order to enable others skilled in the art to which my invention appertains to make and use the same, I will now proceed to describe it, referring to the accompanying drawings, in which—

Figure 1:
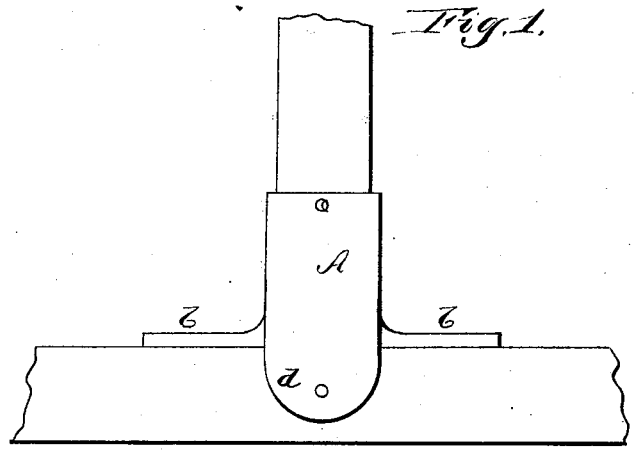
Figure 2:
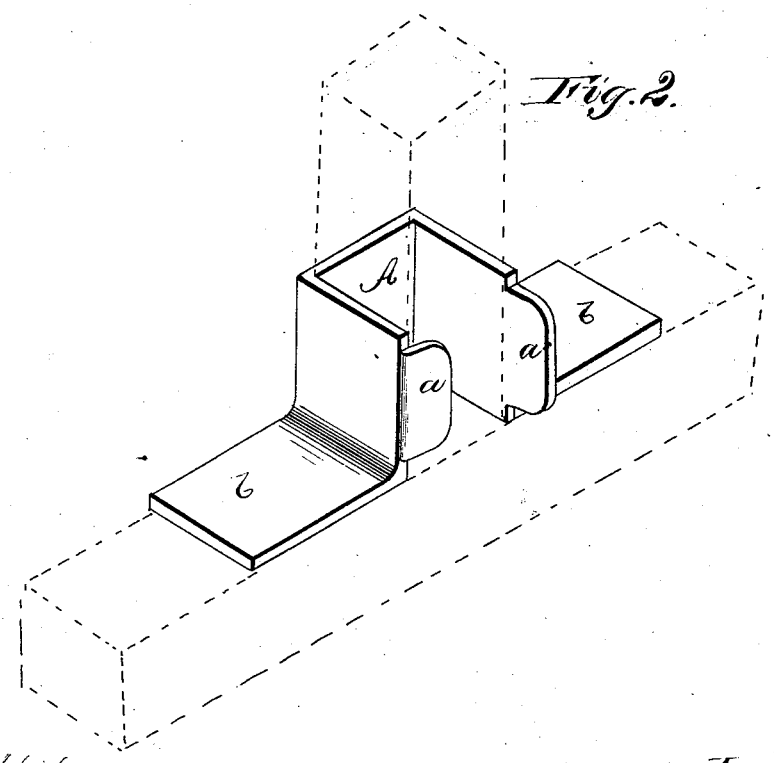

Figure 1 is a side view of my invention applied to a sleigh-runner; and Fig. 2 a perspective view of the box, showing its wings, &c.

A represents a three-sided box of malleable iron, provided upon its outer side with a downward projection, $d$, which passes down and is secured to the runner, forming a brace against any side strain.

Upon the front and rear sides of the box are projecting rests $b\ b$, extending horizontally upon the upper side of the runner, where they are secured, firmly bracing the knee from any strain in that direction.

Extending out from and parallel with the front and rear sides are small wings $a\ a$, which, when the box is slipped into place, are bent down, inclosing the knee upon its inner side and securing the box firmly in place.

The device thus made braces in all directions, is simple, neat, and readily applied after the sleigh is painted and otherwise entirely finished, and is thus not in the way of painting and finishing.

Having thus fully described my invention, what I claim as new, and desire to secure by Letters Patent, is—

1. The sleigh-runner and knee-brace consisting of box A, formed with projecting end $d$, rests $b\ b$, and wings $a\ a$, for inclosing the knee, substantially as shown and described.

2. The within-described sleigh-runner and knee-brace, formed with rests $b\ b$, projecting end $d$, and box A, wholly inclosed on three of its sides and formed with wings $a\ a$, for bending down upon and inclosing the knee upon its other side, substantially as shown and described.

In testimony that I claim the foregoing as my own I affix my signature in presence of two witnesses.

WILLIAM H. PETTIT.

Witnesses:
   WM. M. ROBINSON,
   HENRY J. FELKER.